United States Patent [19]
Guck

[11] Patent Number: 5,848,415
[45] Date of Patent: Dec. 8, 1998

[54] SELECTIVE MULTIPLE PROTOCOL TRANSPORT AND DYNAMIC FORMAT CONVERSION IN A MULTI-USER NETWORK

[75] Inventor: Randal Lee Guck, Dana Point, Calif.

[73] Assignee: Unisys Corporation, Blue Bell, Pa.

[21] Appl. No.: 768,386

[22] Filed: Dec. 18, 1996

[51] Int. Cl.$^6$ ............................................. G06I 17/30
[52] U.S. Cl. ............................ 707/10; 707/103; 395/683
[58] Field of Search .................................. 707/10, 103, 1, 707/2, 100, 104, 200; 395/200, 200.48, 200.36, 200.31, 200.49, 683

[56] References Cited

U.S. PATENT DOCUMENTS

| | | | |
|---|---|---|---|
| 5,261,080 | 11/1993 | Khoyi et al. | 395/500 |
| 5,341,478 | 8/1994 | Travis, Jr. et al. | 395/200 |
| 5,437,025 | 7/1995 | Bale et al. | 395/600 |
| 5,440,744 | 8/1995 | Jacobsen et al. | 395/650 |
| 5,560,005 | 9/1996 | Hoover et al. | 395/600 |
| 5,577,252 | 11/1996 | Nelson et al. | 395/670 |
| 5,596,744 | 1/1997 | Dao et al. | 395/610 |
| 5,613,099 | 3/1997 | Erickson et al. | 395/500 |
| 5,634,010 | 5/1997 | Ciscon et al. | 395/200.15 |
| 5,634,053 | 5/1997 | Noble et al. | 395/604 |
| 5,634,124 | 5/1997 | Khoyi et al. | 395/614 |
| 5,706,434 | 1/1998 | Kremen et al. | 395/200.09 |

FOREIGN PATENT DOCUMENTS

WO 97/30535  8/1997  WIPO ............................ H04L 12/24

OTHER PUBLICATIONS

Moyer et al., "A Connection Manager for Flexible Specification and Transparent Location of Special Resources." IEEE, 1993, pp. 1526–1530.

Gesmann et al. "A Remote Cooperation System Supporting Interoperability in Heterogeneous Environments" IEEE, 1993, pp. 152–160.

Piessens et al. "Interconnecting Domains with Heterogeneous Key Distribution and Authentication Protocols" IEEE, 1993, pp. 66–79

Dhar et al. "Network Interconnection and Protocol Conversion–A Protocol Complementation Approach" IEEE, 1992, pp. 116–120.

Chow "Protocol Issues In Interconnecting ISDN, IN and LAN" IEEE, 1990, pp. 610–616.

Chow "Achieving Multimedia Communications on a Heterogeneous Network" IEEE, 1990, pp. 348–359.

Calvert et al. "Adaptors for Protocol Conversion" IEEE, 1990, pp. 552–560.

*Primary Examiner*—Thomas G. Black
*Assistant Examiner*—Michael Wallace, Jr.
*Attorney, Agent, or Firm*—Alfred W. Kozak; Mark T. Starr; Steven R. Petersen

[57] ABSTRACT

A content server using an object database supports a network of multiple User clients. The database is loaded with virtual objects which constitute source documents in the form of a multiplicity of resource objects, which may be file-oriented objects or message-oriented objects, which enable the format of any source document to be converted to another format compatible for transport via an appropriate protocol to a requesting client User. The resource objects include a multiplicity of converter objects which are defined and placed in the database to provide format transformation from the format of the original source document content into the format required by a calling requester. The object database will be searched to find the proper converter object to transform the contents of the source document into the required format for the calling requester's facilities or for transmittal to a digital appliance in a protocol appropriate to the receiving requester or digital appliance.

8 Claims, 9 Drawing Sheets

SELECTIVE MULTIPLE PROTOCOL TRANSPORT AND DYNAMIC FORMAT CONVERSION IN A MULTI-USER NETWORK

FIELD OF THE INVENTION

This disclosure relates to computer-implemented systems for automatic conversion of content format to accommodate formatting and protocol requirements of multiple client users.

REFERENCES TO RELATED APPLICATIONS

This application relates to the following co-pending applications which are incorporated herein by reference:

U.S. Ser. No. 08/768,387 entitled "Automatic Format Conversion System and Publishing Methodology in Multi-User Network";

U.S. Ser. No. 08/769,199 entitled "A Method for Storing Files of Various Formats in an Object Database Using a Virtual Multimedia File System"; and U.S. Ser. No. 08/769,200 entitled "A Method for Abstracting Messages of Various Protocols Into Objects For Storage in a Database", filed Dec. 18, 1996, now U.S. Pat. No. 5,794,039 issued Aug. 11, 1998.

BACKGROUND OF THE INVENTION

In the rapidly developing area of digital technology, there is an expanding use of networks with multi-client users which can be connected to the multitudinous terminals of the Internet or to the limited number of terminals in an Intranet set-up for a particular group or set of clients.

Such type of networks with multiple numbers of connected clients present many problems in that many of the client stations are limited to particular types of content format and protocol delivery. Further, when it is desired to communicate with FAX machines and telephones, in addition to e-mail, again, there are specialized formats and protocols that are required to enable these types of communications to take place with these specialized appliances or terminals.

It has become more and more desirable to provide systems and methodology which enable clients using one type of personal computer and its specialized protocol requirements to communicate with other clients having different personal computers with different formats and protocol requirements. Likewise, it is desirable to enable a user client's personal computer, using one type of protocol, to be able to communicate with FAX machines, telephones and e-mail clients, which require different content formats and different protocols for communication delivery.

Earlier network technologies and even the majority of present network technologies involve slow and complex software systems and methods in order to enable a client having a document in one particular format, and using a particular protocol to communicate with another client terminal having a different protocol or with terminals having the protocols and formats used for the FAX machine or the protocols used for the telephone. These often involve long, drawn-out translation procedures which were slow, cumbersome and subject to reliability problems.

It would be most desirable to provide a network where any client, no matter what format his document consists of, or what his personal computer protocol system utilizes, could create, originate or author a document and enable this document's content to be suitably formatted for transmittal to and reception by personal computer clients or appliances requiring specialized formats and different types of protocol so as to be received by appliances such as FAX machines, telephones and e-mail users. Heretofore, this has not been done with any great efficiency whereby an originator or author could originate a text or message in his own personal format and, using his personal appliance protocol, send it to multiple receiver users and multiple receiver appliances without any further complications other than sending his text or message into the network after it has been automatically processed and handled by a server which distributes his origination in any and all formats necessary to be received by any of the receiving appliances using the compatible protocol. Such a system and methodology is now possible with the presently described system and methodology.

Referring to FIG. 1, there is seen a flexible, multi-user network system whereby a client-user is capable of authoring text, graphics, or messages which can be distributed to multiple receiver terminals regardless of the format and protocol requirements that these receiver terminal appliances are subject to.

As seen in FIG. 1, a client personal computer 10 which uses a Web Browser is connected to network 40 as is also the personal computer client 20 and the mail user client 30. This could also include a unit designated as a News Network User in the personal computer client 33.

As seen in FIG. 1, the client Personal Computer (PC) 10 uses the HTTP protocol (Hyper Text Transport Protocol). This is a client-server protocol used for information sharing on the Internet and is the basis of use for the World-Wide Web (WWW). The PC client 20 is seen to have a Web Browser using the FTP (File Transfer Protocol). FTP provides a set of commands to log onto a network, to list directories and to copy files.

The Mail User Client 30 is seen to use the SMTP protocol which denotes Simple Mail Transfer Protocol. This is a messaging protocol used by software applications to send e-mail to receiving terminals.

A further client indicated in FIG. 1, is a unit designated as the News User used in the personal computer client 33. This unit uses a particular protocol designated as NNTP or News Network Transfer Protocol.

As seen in FIG. 1, the Network 40 is connected for communication to the Server 50. The Server operates as a computer in a network shared by multiple users. It can act as a file server whereby it uses a high-speed computer to store the programs and store the data files and messages which are shared by the various users on the network. Sometimes this is called a "network server", since it acts like a remote disk drive. The Server 50 can also act as a database server in that it is dedicated to database storage and retrieval.

The Server 50 is seen to provide a multiple number of server processes 52a, 52b, . . . 52n, which provide programs (in the Server Processes module 52) which implement the operation of the Server 50.

Within the Server 50 is a database 58 which provides an electronically stored collection of data. The database 58 is managed by the database manager 54, which involves software that allows a user to manage multiple file and message "objects". In the present embodiment, the module 54 is a specialized database manager called OSMOS. OSMOS is a specialized system which is an object database management system.

The OSMOS database manager 54 provides software that enables database management capability for traditional programming languages, such as COBOL, BASIC, and C and C++. It also enables the storage and retrieval of data from the database 58.

The operational functioning of the OSMOS database manager 54 is handled by the unit designated Schema 56, which defines the entire database. The Schema 56 sets up the organization of the database and the ways that the entire database 58 is used.

Further, as seen in FIG. 1, the Server software processes module 52 is connected to the Public Switched Telephone Network 60 (PSTN), which provides connection lines to the telephone 80 using Interactive Voice Response applications (IVR). IVR applications provide pre-recorded information either with or without selection by the caller. IVR applications also allows interactive manipulation of a database. In response to a voice menu, users press the keys or answer questions to select their way down a path of choices. IVR applications could be used for obtaining the latest financial quotes, as well as for ordering various products. They can also be built into interactive systems to allow databases to be changed.

The FAX appliance 70 of FIG. 1 operates on a special format designated as the Group 3 Facsimile Protocol which is widely used for facsimile transmission.

The present system provides a means for communication between multiple users, together with a simpler and more expanded method for sending data to different types of appliances using different formats and operating under different protocols. This is handled by the Server 50, which provides specialized techniques, as will be discussed hereinafter, which permit a single originator to communicate to multiple different types of recipient terminal appliances. These terminal appliances include both telephone and FAX machines and e-mail, Web Browser, and News Users, all operating via different protocols. These specialized features are provided for by the utilization of a specialized server having the controlled database manager 54 designated OSMOS where the protocol "envelopes" for handling document content are controlled by the server processes module 52.

The Server module 50 provides a mechanism that enables secure communications to occur between the clients, such as 10, 20, 30, 33 etc., and the Server 50. It provides a database repository for all documents, together with the ability to index and search the documents with a powerful search engine. The search engine and its supporting database 58 uses the OSMOS 54 database manager to manage the storage, verification, and access to resident documents which include embedded graphics, sound clips, and video clips.

As will be discussed hereinafter, the Server 50 includes a set of conversion filters (converters) which provide "on-the-fly" conversion of documents authored in one specific format to be transformed into other formats for display, for printing, for e-mail or voice or for FAX appliances. The database software "converts" an incoming document request into the appropriate format that is required by the "outgoing" client display device, whether it be a FAX appliance 70, a File Transfer Protocol (FTP) Browser 20, a Hyper Text Transfer Protocol (HTTP) Browser 10, or voice for the telephone 80.

The present system enables a user to author documents once, and the system provides a dynamic conversion system for enabling multiple types of format conversion. Additionally, the system handles both file and message documents for delivery to a requester while supporting the appropriate protocol to carry and deliver the content of the document.

SUMMARY OF THE INVENTION

The present system and methodology provides for the origination and storage of a "source" document as a designated "object" in an object database. A source document can be submitted in the form of a "file" in which case it is stored as a "Virtual File" object. A Virtual File object is analogous to a normal system file except that, as a database object, it has additional properties and behavior that a system file normally does not have. Virtual File objects are organized into named directories, each of which are also represented in the database as an object.

Alternatively, a source document can be submitted in the form of a "message" such as an e-mail message or news article. In this case, it is stored as a "Virtual Message" object within the database. Virtual Message objects are organized according to their purpose, such as whether they are intended for e-mail users, news users, or other users utilizing some other message-oriented protocol. Virtual File objects are "posted" by connecting them to one or more "Message Board" objects. Each Message Board object is named and represents a logical folder such as a mail folder or news group.

The terms "Virtual File", "Virtual Message", and "Message Board" refer to different kinds of "resources". Any document that can be authored and therefore have "content" is stored within the database as a resource object. Using object technology classification techniques, each resource object is then classified as a Virtual File or Virtual Message object and then further classified based on "file" content type or "message" type.

Documents are transmitted from a User-client to a server and stored in an object database as a "Resource Object".

When a User connects to a server using a particular protocol and seeks a document via a "get" request, the server finds the corresponding resource object and, if necessary, can dynamically modify its characteristics to accommodate formatting requirements requested by the User and/or formatting requirements required by the protocol being used. A document can be dynamically converted into a wide range of formats and accessed via a wide range of protocols without the document's author having to anticipate the formats and protocols that users may require ahead of time.

A dynamic conversion methodology is provided to use Resource objects in the database to set up a requested document in the format appropriate to the User-requester.

The dynamic conversion technique utilizes a "converter", which is another type of "object" within the database. Each converter object has the ability to transform one kind of resource object into another kind of resource object. When a User requests a document's content in a format different than that in which it is currently encoded, and/or if the document is requested using a protocol with which the document is not immediately transferable, the server automatically finds and utilizes a converter object which transforms the document's content to a format compatible with the request. The selection of a converter object and the dynamic conversion of the document's content take place automatically, without the requesting User aware of the operation and without the document's author having to specially prepare the document before hand.

The dynamic conversion technique works equally well for conversion from one resource type to another and/or from one content format to another. For example, one converter object could convert an e-mail message into a text file, while another converter could convert a plain text file to an HTML file. Multiple converter objects can be used in a single document retrieval request so that a resource object's content can be converted both to another resource type (e.g., message to file) and to another content format (e.g., plain text format to HTML format). Consequently, converter objects can be used to convert a resource to accommodate different content formatting requirements (e.g., plain text, HTML, postscript) as well as different protocol requirements (e.g., mail, news, FTP, etc.)

DESCRIPTION OF THE PREFERRED EMBODIMENT

Before describing the details of the current invention, some terminology used herein is defined. The term "format" refers to the specific arrangement of data on a disk or other storage media in order to meet established application requirements. For example, a file can be stored in the format of a certain application such as Microsoft Word; an international standard format such as Hyper Text Markup Language (HTML); or a generic application "neutral" format such as "plain text". In addition to their use within disk files, formats can also be used within portions of messages sent over a network. For example, an "attachment" within an e-mail message can utilize a specific format such as plain text or HTML.

The term "protocol" refers to a set of formal rules describing how to transmit data, especially across a network. Low-level protocols define the electrical and physical standards to be observed, such as bit-ordering and byte-ordering and the transmission and error detection and correction of the bit stream. High-level protocols deal with data formatting, including the syntax of messages, the client-server dialog, character sets, and sequencing of messages. As used herein, the term "protocol" refers to the highest-level protocol employed by a given client-to-server connection.

Figure 1:
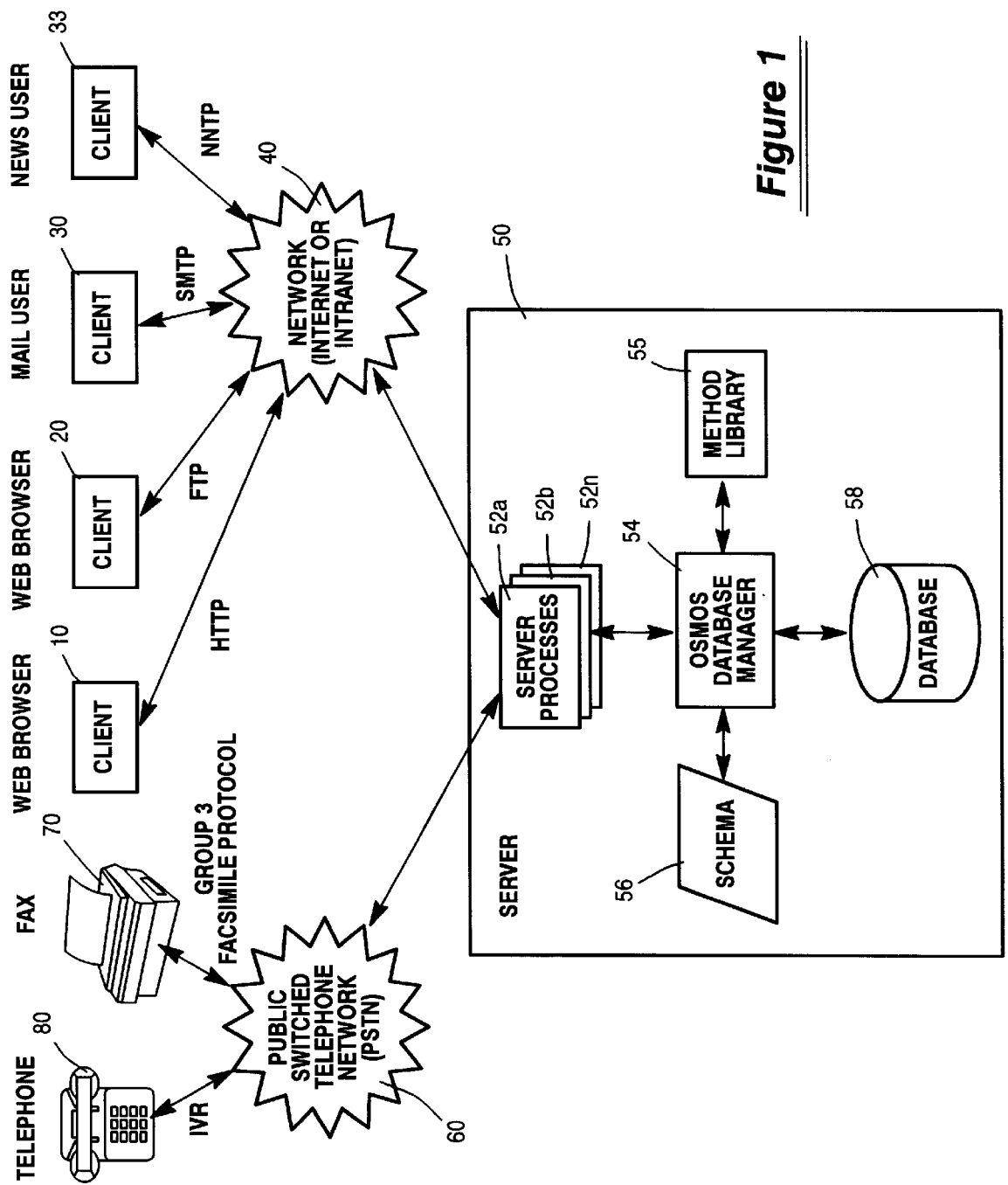
FIG. 1 is an overall network diagram showing the interrelated modules which function to utilize the methodology of the present system of dynamic format conversion and protocol transport.

Referring now to FIG. 1, a specialized Server 50 is connected to the network 40. The network 40 has communication connections to the client 10, the client 20, the client 30 and the client 33, each of which involves different communication protocols. Further, the Server 50 also has communication connections to the Public Switched Telephone Network 60, which enables communications to and from the FAX machine 70 with a facsimile protocol and with the Telephone 80 using an Interactive Voice Response protocol.

The generalized problem faced by client users in this type of network is that the user will author or originate "source" information in one particular format designated for various recipients but that the recipients use different document formats for their appliances and/or completely different protocols. For example, the author may create a source document in Microsoft Word format and store it at the Server using the FTP protocol. Another user may wish to access the document as an HTML file using the HTTP protocol. Yet another user may wish to access the document as an e-mail message using a mail protocol such as IMAP (Internet Message Access Protocol). Still another user may wish to listen to an audible rendition of the document using a standard telephone.

With older systems, the author must anticipate the needs of each recipient, and he must manually convert his information into multiple formats to meet not only their formatting requirements but also the requirements of the communication protocols that they wish to use. For example, if the source document is an image file in JPEG format and at least one recipient requires the image in GIF format, the author must manually convert the JPEG file into a GIF file. Furthermore, if at least one recipient wishes to receive the GIF file via e-mail, the author must also encode the GIF file with a "transfer encoding" technique since GIF files contain binary codes which are not directly transferable via standard e-mail protocols. With the system described herein, a user can author information once and store it in a centralized server, and the system will dynamically convert the information as needed into a format that accommodates both the formatting and protocol requirements of a specific recipient who is requesting the information from the server.

In order for information to utilize the dynamic conversion methodology, a user must first create or obtain the source information in the form of a document. The source document must then be stored at the Server 50. The author accomplishes this by using a Client tool and connecting to the Server using any of a wide range of protocols such as the File Transfer Protocol (FTP), Hyper Text Transfer Protocol (HTTP), Simple Mail Transfer Protocol (SMTP), or the Network News Transport Protocol (NNTP). Typically, a user will use a Client tool best suited for the type of document that he has authored, including its purpose and format. For example, if the document is authored as a file, he will use a Client tool that uses a file-oriented protocol such as FTP. If the document is authored as a message such as an e-mail message, he will use a Client tool that uses a message-oriented protocol such as SMTP. Any protocol which can connect to the Server and perform a "send" command can be used to deliver a document to the Server.

The Client tool's "connect" request causes one of the Server Processes 52 to be started. A specific type of Server Process is started which can handle the protocol being used by the Client. The Server Process "opens" the database by communicating with the OSMOS Database Manager 54. The author must then perform a "put" or "send" command as provided for by the protocol that he is using. The "put" or "send" command causes the document to be sent to the Server and received by the Server Process. The Server Process in turn directs the OSMOS Database Manager to create an "object" and store it within the Database 58. The Server Process further directs the OSMOS Database Manager to store the document's content within the database as one or more properties of the object.

The database object created on behalf of the document represents a "virtual" form of the document because it is accessible in its original form (as a file or a message), but it is realized as a database object. The type of objects that can be stored within the database and the operations which can be performed upon them are defined in the database schema 56. The encoding of special functions, called "methods", which can be used to manipulate objects, are contained within the Method Library 55. When a Server Process directs the OSMOS Database Manager to create a database object or perform some other function on a database object, the OSMOS Database Manager performs some of these requests directly on the Database 58, while some requests are routed to the Method Library for execution. The functions within the Method Library are largely responsible for controlling the type and properties of the database object created on behalf of a document.

Figure 2:
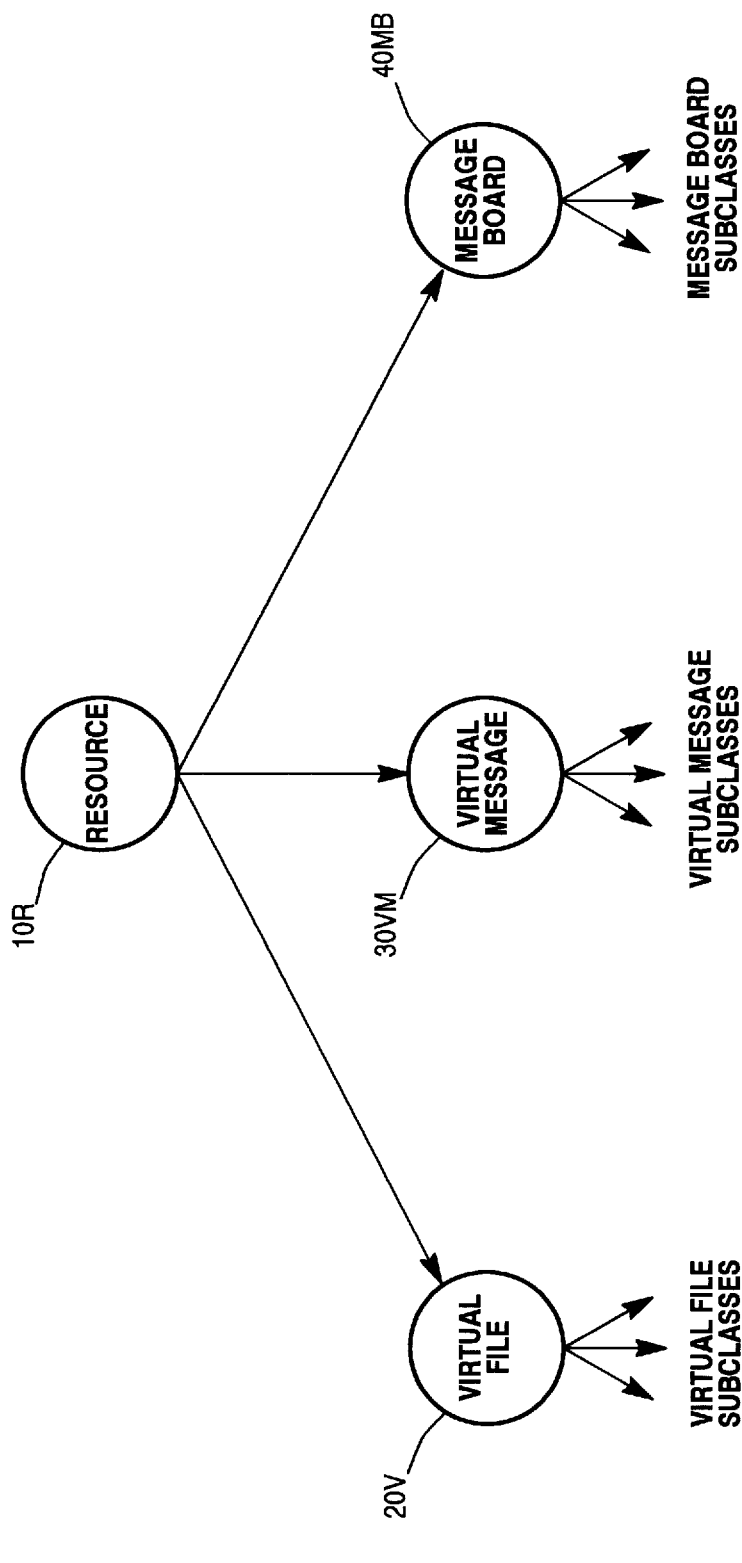
FIG. 2 is a drawing which illustrates the "resource" object types used within the database. It shows how the Resource object type is subdivided into the Virtual File, Virtual Message, and Message Board object types, each of which are further subdivided into additional object types.
Figure 3:
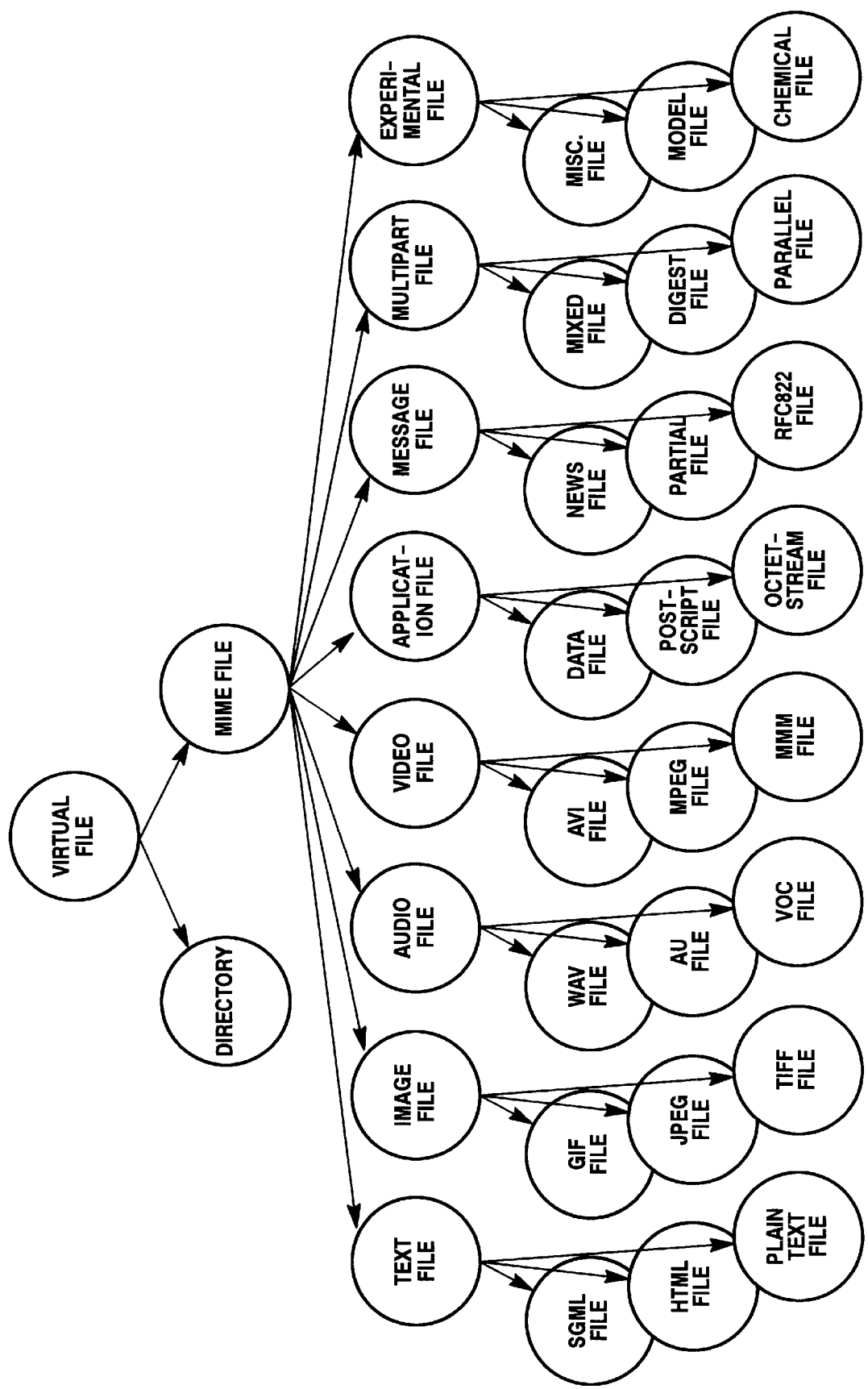
FIG. 3 is an object hierarchy diagram showing how the Virtual File object type is subdivided into Directory and MIME File object types. MIME File is further subdivided into object types first according to MIME type, and then each MIME type object type is divided according to MIME subtype.

Referring to FIG. 2, the database object created to hold the document's content is a "resource" object. This means that the object belongs to the "Resource" type 10R, which is the root type of an object hierarchy. A resource object is created for each document which possesses content. If the document is delivered as a file, the resource object is also inserted into the Virtual File type 20V, which is a "subtype" of the Resource type. Alternatively, if the document is sent as a message, the resource object is inserted into the Virtual Message type 30VM, which is also a subtype of Resource. (Objects of type Message Board 40MB are not created as a result of a document "put" request but rather by other commands used by various protocols.) In addition to the Virtual File or Virtual Message subtype, the resource object is inserted into additional subtypes depending upon other characteristics of the document. Referring to FIG. 3, if the Resource object is a Virtual File object, it is inserted into one or more lower-level subtypes of the Virtual File type. This is done by determining the file's "MIME type" and using this information to include the object in a matching subtype. For example, if the file is a "plain text" file, the object is included in the Plain Text File subtype. If the file is a GIF image file, the object is included in the GIF File subtype. MIME refers to the "Multi-purpose Internet Mail Extensions" standard, which extends the SMTP standard with a means for classifying the content of e-mail messages. The use of the MIME standard within an object database in order to effectuate a "Virtual Multimedia File System" is the subject of the co-pending patent application U.S. Ser. No. 08/769,199 entitled "A Method for Storing/Retrieving Files of Various Formats in a Object Database Using a Virtual Multimedia File System".

When a document is submitted as a file, the author gives it a file name, which is stored as a property of the Virtual File object. This allows the Virtual Object to be later retrieved by the same file name.

Figure 4:
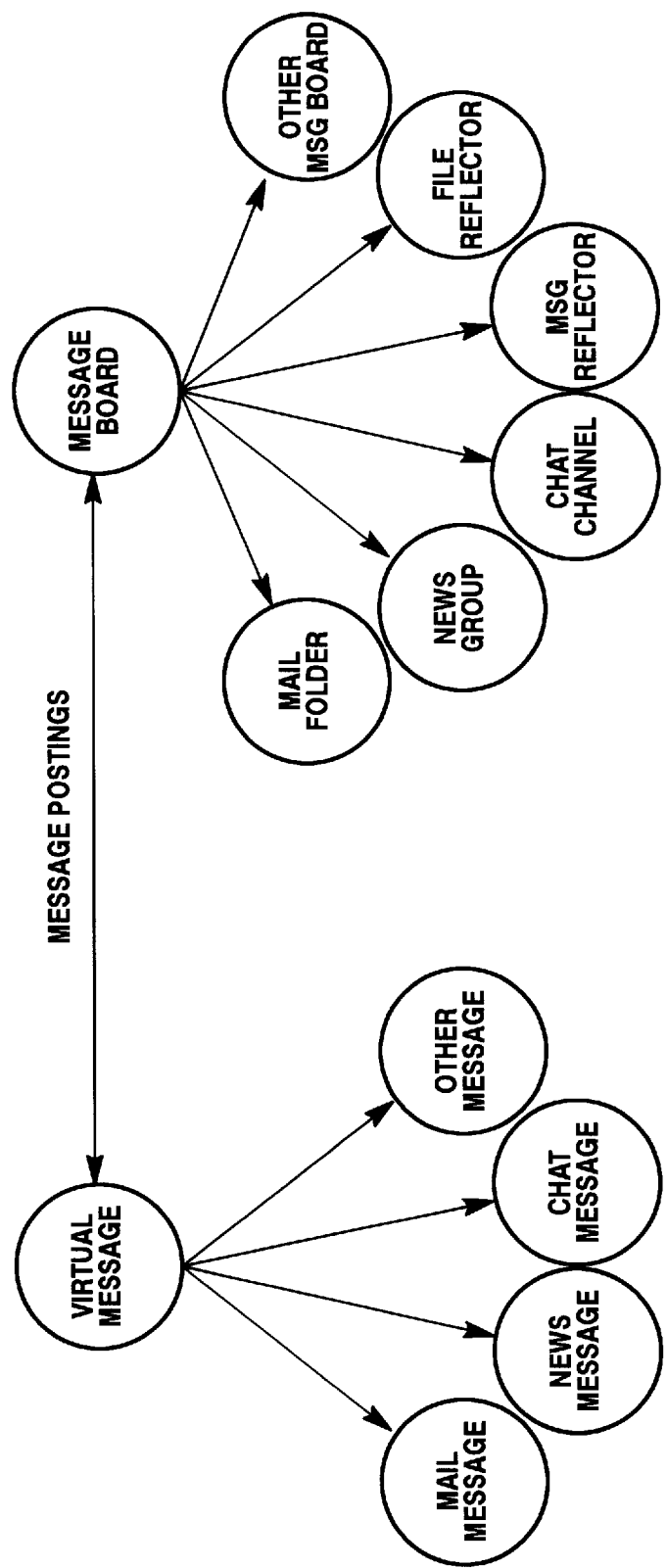
FIG. 4 is an object hierarchy diagram showing how the Virtual Message and Message Board object types are divided into subtypes based on the purpose of each object type's corresponding objects.

Referring to FIG. 4, if the Resource object is a Virtual Message object, it is also inserted into a subtype of the Virtual Message type. The subtype employed will match that of the protocol being used to send the document. For example, if an e-mail protocol is being used (e.g., SMTP), the object is included in the Mail Message type. If the protocol is a news protocol (e.g., NNTP), the object is included in the News Message type. The storage and manipulation of messages as objects within a "Virtual Message System" is the subject of the co-pending patent application U.S. Ser. No. 769,200 entitled "A Method for Abstracting Messages of Various Protocols Into Objects for Storage in a Database".

A message document is always "posted" to one or more "Message Boards" as identified in the "send" command. This means that the Virtual Message object is connected to appropriate Message Board objects using object connecting techniques. The message document can be subsequently retrieved by submitting the name of a message board to which it is posted and a "message number" which identifies the posting position within the message board. Often, a message document will be assigned a unique "message id" which also can be used as an alternative method for locating the message.

The Resource object created on behalf of the document is assigned "properties" that represent the document's content and identity. After successful creation of the database object, the Server Process returns a successful result code back to the Client. The source document is subsequently available for access by any Client connected to the network.

Figure 8:
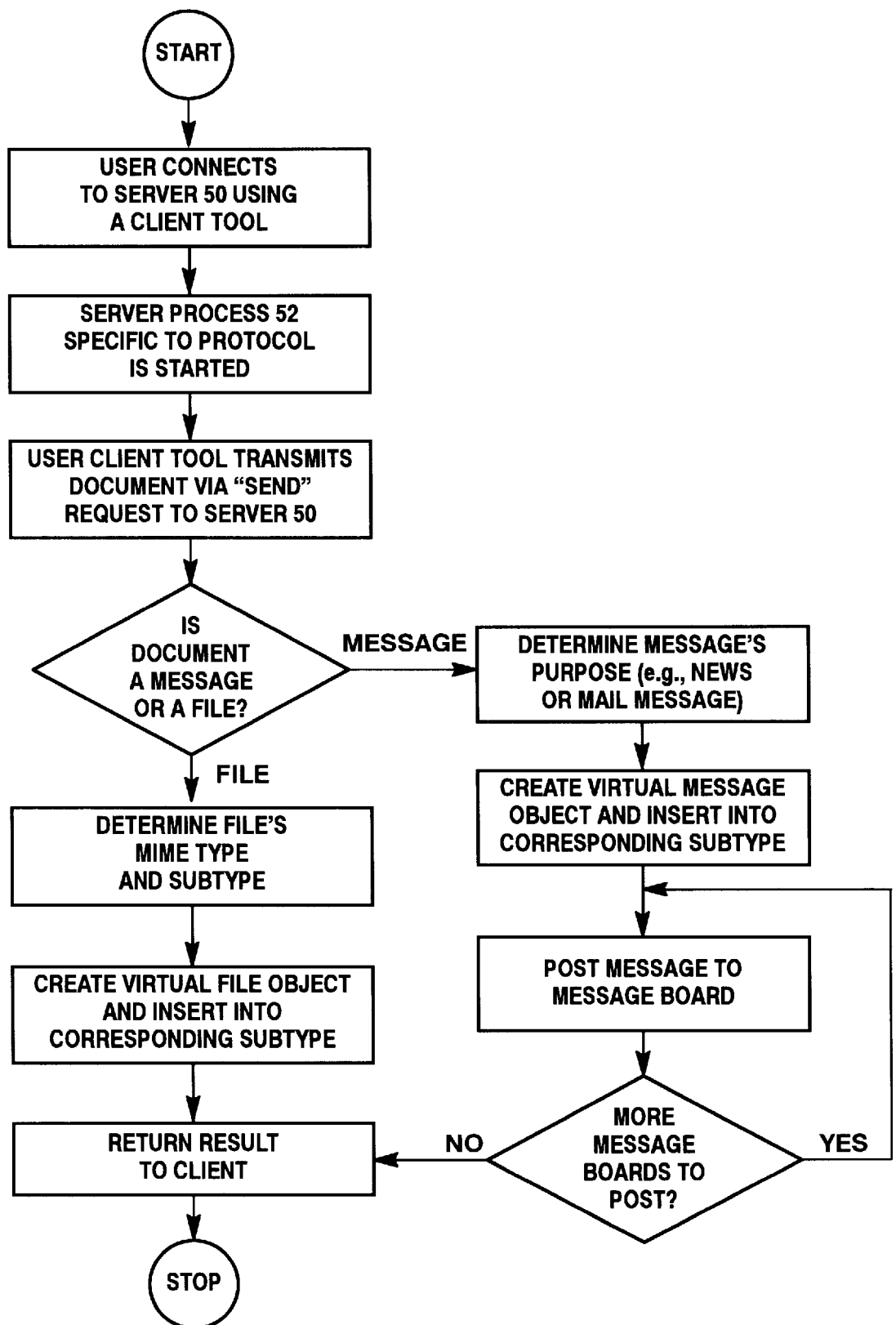
FIG. 8 is a flow chart illustrating the procedural steps used to send documents to the server and store them as resource objects.

The steps for sending a document from a client to the Server and storing it in the database as a resource object is depicted in FIG. 8 and summarized below:

(i) A User utilizes a client tool (10, 20, 30, or 33) to connect to server 50 via network 40.

(ii) The client tool's "connect" request causes a Server Process 52 to start activity particular to the type of protocol used.

(iii) The User performs a "send" request to transmit a document to the Server 50. The "send" request is accompanied with document identification such as a file name or a message id. If the document is a message, it is accompanied with a list of message boards to which the message is be posted.

(iv) The Server Process 52 uses the identification information to create an appropriate resource object. If the document is a file, a Virtual File object is created whose subtype corresponds to the file's MIME type and subtype. If the document is a message, a Virtual Message object is created whose subtype corresponds to the message's purpose. The document's content is stored as one or more properties of the object.

(v) If the object is a message, it is posted to each requested message board.

(vi) A result code is returned to the client.

Referring back to FIG. 1, the process for retrieving documents and the dynamic conversion methodology is now described. In order to retrieve a document, a user utilizes a Client tool such as 10, 20, 30, or 33 to connect to the Server 50 via the Network 40. Or, the user can use a telephone appliance such as a FAX machine 70 or a Telephone 80 to connect to the Server via the public telephone network 60. The user utilizes a Client tool and protocol that best suits the way in which he wishes to use the document. The user can utilize a tool that uses a file-oriented protocol such as FTP or HTTP, or a message-oriented protocol such as NTTP or POP3. In general, any tool that uses a protocol that is capable of performing a "get" request can be used to retrieve documents from the Server. (In the case of FAX machine access, the Server must initiate a FAX "send" request, but this could be prompted by a "FAX back" request given from some other client tool such as a telephone or Web Browser).

The Client tool's connect request causes a Server Process 52 to be started specific to the type of protocol being used. The user then performs a "get" request for the document he seeks in accordance with the protocol that he is using. The "get" request must be accompanied with some kind of identification of the document such as a file name or message id. Typically, file-oriented protocols such as FTP will use a file name to identify the target document. Message-oriented protocols will use either a message id (identification) or a combination of a message board name and a message number to uniquely identify the message.) The Server Process uses this identification information to call the Database Manager 54 and attempt to locate a resource object in the Database 58 that corresponds to the document.

The retrieval algorithm allows any resource to be found using any protocol. In the simplest cases, the document is sought with the same protocol or a similar protocol with which it was originally stored. For example, if the document was stored as a file, it can be sought via any file-oriented protocol by supplying the same file name that was originally assigned to the file. If the document was stored as a message, it can be sought by supplying the same message id with which the message was stored, or it can be sought by supplying the name of one of the message boards to which it is posted along with a message number that uniquely identifies the posting within that message board.

If the document is sought with a substantially different protocol than that used to store it, a "pseudo name" can be used to find the document. For example, if the document was stored as a file but is being sought via a message-oriented protocol, it can be retrieved by submitting a message board name equal to the file's file name and by submitting a message number equal to 1. If the document was stored as a message and is being sought via a file-oriented protocol, it can be retrieved by submitting a file name that identifies the type of message board desired, the name of the message board, and the message number. For example, the file name:

"#news/comp.unix.misc/3"

could denote that the user is seeking the third message (denoted by the "3") posted to a message board (denoted by the "#" symbol) that is a news group (denoted by the term "news") whose name is "comp.unix.misc". Because documents are stored as logical objects within the database, a variety of methods can be implemented to allow them to be searched and retrieved. Consequently, a variety of pseudo name schemes can be used to allow documents to be retrieved by a wide range of protocols.

If, after taking into account the protocol being used and available pseudo name schemes, the Server Process 52 cannot find a resource object that matches the "get" request, an error is returned to the user.

If the "get" request successfully identifies a resource object, the Server Process 52, with assistance from the Method Library 55, determines if the object's content is in a format that is compatible with other parameters given in the user's "get" request. For example, some protocols, such as HTTP, can specify a list of one or more MIME types that the Client tool can handle. FAX machines must be sent information in a Group 3 Protocol image format. It is possible, therefore, to recognize that the Client can not handle the format with which the document is currently stored. For example, a Client can retrieve an image document stored as a JPEG File but specify in the "get" request that only GIF format image files can be handled. In this case, the most desirable effect would be to translate the JPEG document into an equivalent GIF document.

Another situation that can occur is that the document selected by the "get" request is not stored in a format that can be handled by the protocol being used. This always happens, for example, when a file is retrieved via a message-oriented protocol because message protocols require separate "envelope" and "body" components whereas files only possess a "body". This situation requires that a suitable envelope be generated to match the requirements of the protocol. Furthermore, some message-oriented protocols can not directly transfer binary data whereas some document formats allow binary data. In these cases, the binary data must be encoded with a "transfer encoding" scheme which the protocol will allow and that the Client can decode to reproduce the original content.

If the Server Process 52 detects that the Resource object selected is already stored in a format which is compatible with the "get" request, then the object's content is simply extracted and returned to the client following the rules stipulated by the protocol.

Figure 5:
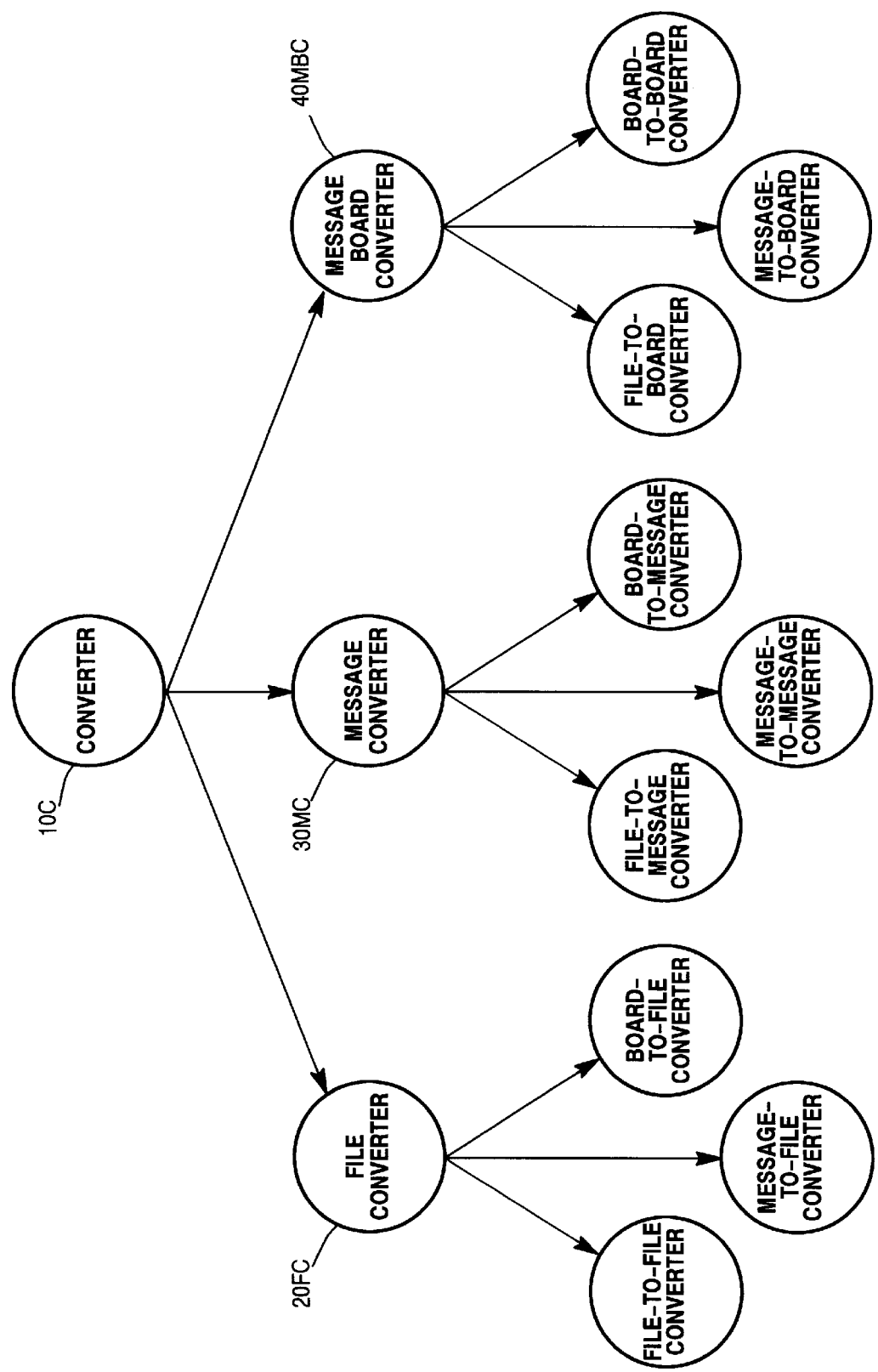
FIG. 5 is an object hierarchy diagram showing how the Converter object type is divided into object types first based on "output" resource type and then on "input" resource type.

However, if the resource object's current content format is not compatible with the "get" request for some reason, then the Server Process 52 attempts to locate a "converter" object which will convert the content into a compatible form. Referring now to FIG. 5, the database 58 possesses an object hierarchy known as the "converter object hierarchy". The Converter type 10C is the root of the hierarchy. The Converter type is divided into subtypes that represent "output resource" types: File Converter 20FC, which will produce output in a file format; Message Converter 30MC, which will produce output in a message format; and Message Board Converter 40MBC, which will create or maintain a message board as its output. Each "output" converter type is further divided into subtypes that represent an "input resource". For example, the File Converter type has the subtypes: File-to-File Converter, which accepts file content as input; Message-to-File Converter, which accepts message content as input; and Board-to-File Converter, which accepts an entire message board as input.

The bottom-most (FIG. 5) or "leaf" Converter types (e.g., File-to-File Converter, Message-to-File Converter, etc.) have additional "properties" which further define the kind of conversion that objects of that type will perform. Many leaf Converter types are assigned an "input MIME type" and an "output MIME type" which define the format of data that they can receive and the format of data that they will generate. So, for example, the File-to-File Converter type has both input and output MIME type properties, hence a specific File-to-File Converter object can indicate that it can accept "image/JPEG" input and produce "image/GIF" output. This means that the object can accept a JPEG File object as input and produce an equivalent file (that represents the same picture) in GIF output.

The Converter type hierarchy is populated with numerous converter objects, each of which can perform a specific conversion. All Converter objects possess a "transform" function which can be called to perform its corresponding conversion process. The actual algorithm used by each Converter object's "transform" function depends on the particular type of transformation that it performs. Some conversions are simple and some are very complicated. The present system is provided with several hundred converters, which handle the conversion of numerous text, image, video, audio, and other formats. Furthermore, the Converter type provides "search" functions that a Server Process can use to locate an object that fulfills a specific conversion requirement.

Consequently, when a Server Process 52 discovers that its "get" request is requesting a document which can not be delivered to the Client in its current form, it searches the Converter hierarchy for an object which can convert the document to a form which the Client can handle. The search includes "keys" which specify both input and output resource requirements, input and output MIME type requirements, if any, and other parameters such as an output transfer encoding scheme. Thus, the Server Process can locate a Converter object that satisfies not only a resource conversion due to protocol requirements (e.g., accessing a file via a message protocol or vice versa), but a format conversion as well (e.g., accessing a JPEG image when a GIF image is required).

If no Converter object exists that will satisfy the required conversion, either an error is returned to the Client or the document is returned "as is" to the Client anyway, depending upon Server configuration options. If a suitable Converter object is found, its transform function is called, passing the found document's content as the input parameter. The transform function's output, which is now in the desired format, is returned to the Client to satisfy the "get" request.

In summary, the Converter object type hierarchy has numerous converter objects, each of which can perform a specific conversion. Each converter object processes a "transform function" which can be called to perform a particular conversion process.

Figure 9:
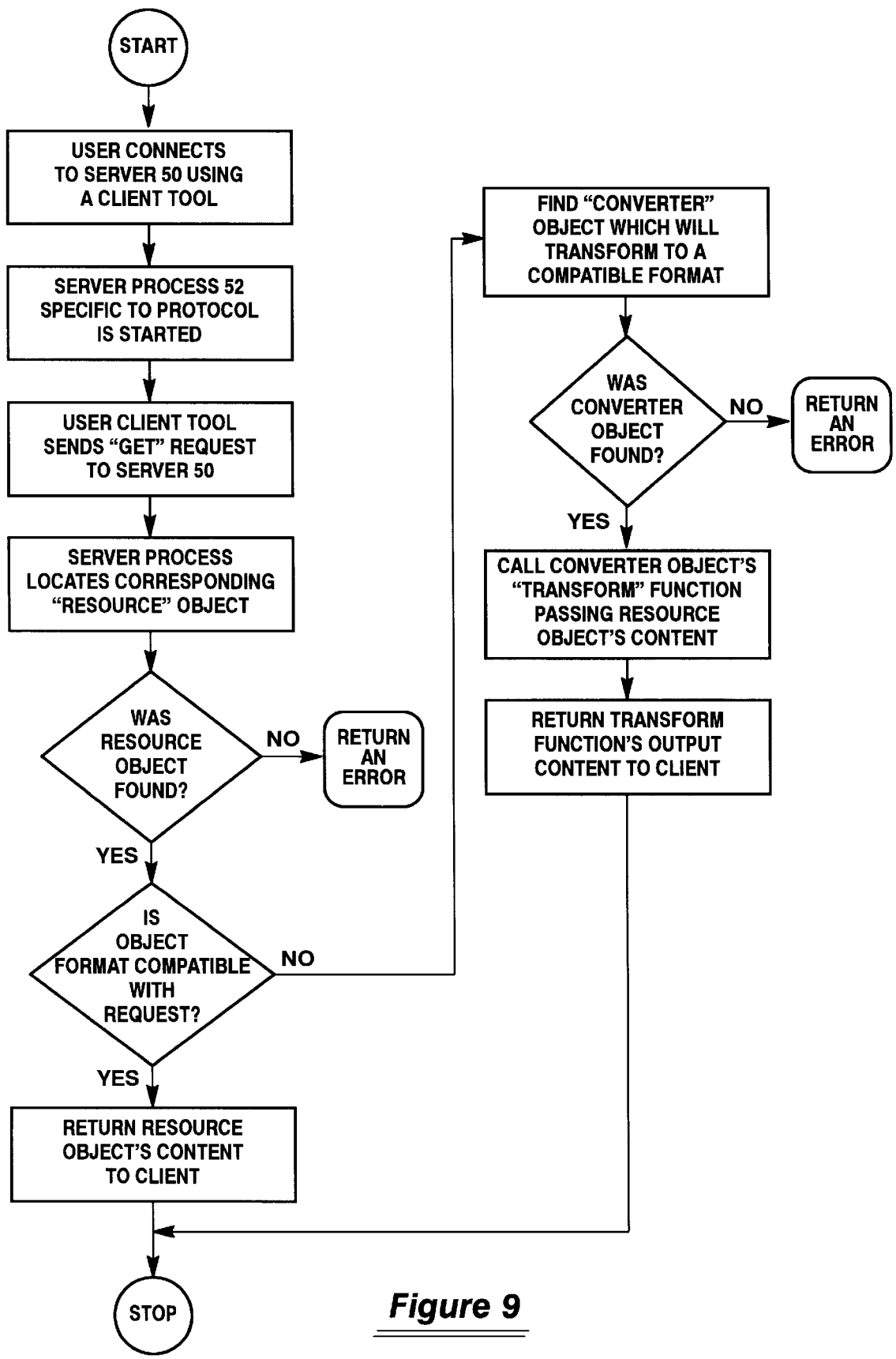
FIG. 9 is a flow chart showing the series of steps whereby a source document is requested and dynamically converted into a format which matches the requirements of the requester.

The dynamic conversion methodology is depicted in FIG. 9 and summarized below:

(i) A User utilizes a client tool (10, 20, 30, or 33) to connect to server 50 via network 40 or a telephone appliance such as fax machine 70 or telephone 80 to connect to server 50 via public telephone network 60.

(ii) The client tool's "connect" request causes a Server Process 52 to start activity particular to the type of protocol used.

(iii) The User performs a "get" request to retrieve a document from the Server 50 (for fax machine access, the Server initiates a fax "send" request). The "get" request is accompanied with identification of a document such as a file name or a message id. If the document is sought with a substantially different protocol than that which was used to store it, a "pseudo name" can be used to find the document.

(iv) The Server Process 52 uses the identification information to call the data base manager 54 to locate a resource object in the database 58. If no matching resource object is found, an error is returned to the user.

(v) When the "get" request successfully identifies a resource object, the Server Process 52 (assisted by Method Library 55) determines if the object's content is in a format compatible with the client's protocol and other parameters in the "get" request. If the document is compatible, it is returned to the client.

(vi) If the client cannot handle the format in which the document is currently stored, the Server Process 52 locates a "converter" object which will convert the document's content into a format which is compatible with the client's protocol and all other parameters specified in the "get" request. If no suitable converter object is found, an error is returned to the client.

(vii) If a suitable converter object is found, its "transform" function is called with the resource object's content passed as a parameter. The resulting transformed content is returned to the client.

Figure 6:
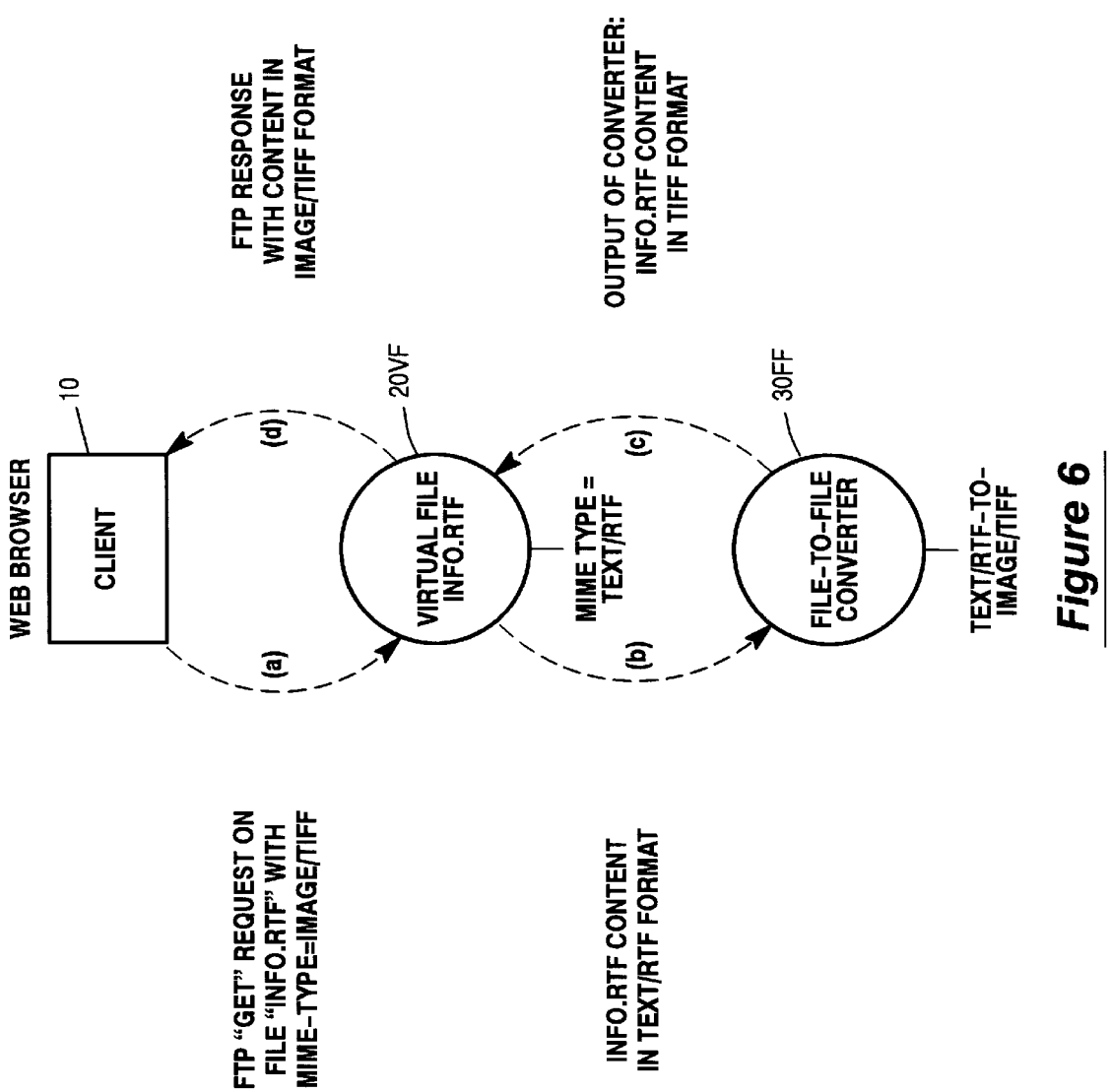
FIG. 6 illustrates an example of a dynamic content conversion session. A Web Browser is shown requesting a file in a format different from that in which it is stored, requiring its content to be transformed via a file-to-file converter.

An example dynamic conversion session is depicted in FIG. 6. As shown, a Client represented as a Web Browser 10 is using the FTP protocol. The client has sent a "get" request, shown on line (a), for the file 20VF whose name is "info.rtf". Furthermore, the "get" request includes a parameter that requests the file in image/tiff format. (TIFF represents Tagged Image File Format.) However, the content of the corresponding Virtual File object is stored in text/rtf format. (RTF represents Rich Text Format.) Consequently, a File-to-File Converter object 30FF has been located which converts text/rtf files to image/tiff files. As shown on line (b), the Virtual File object's text/rtf content is extracted and passed to the Converter object's "transform" function. The output of the transform function is the equivalent content in image/tiff format, and this content is returned to the Virtual File object as shown on line (c). The image/tiff content is then appropriately packaged as an FTP response and returned to the client, as shown on line (d).

Figure 7:
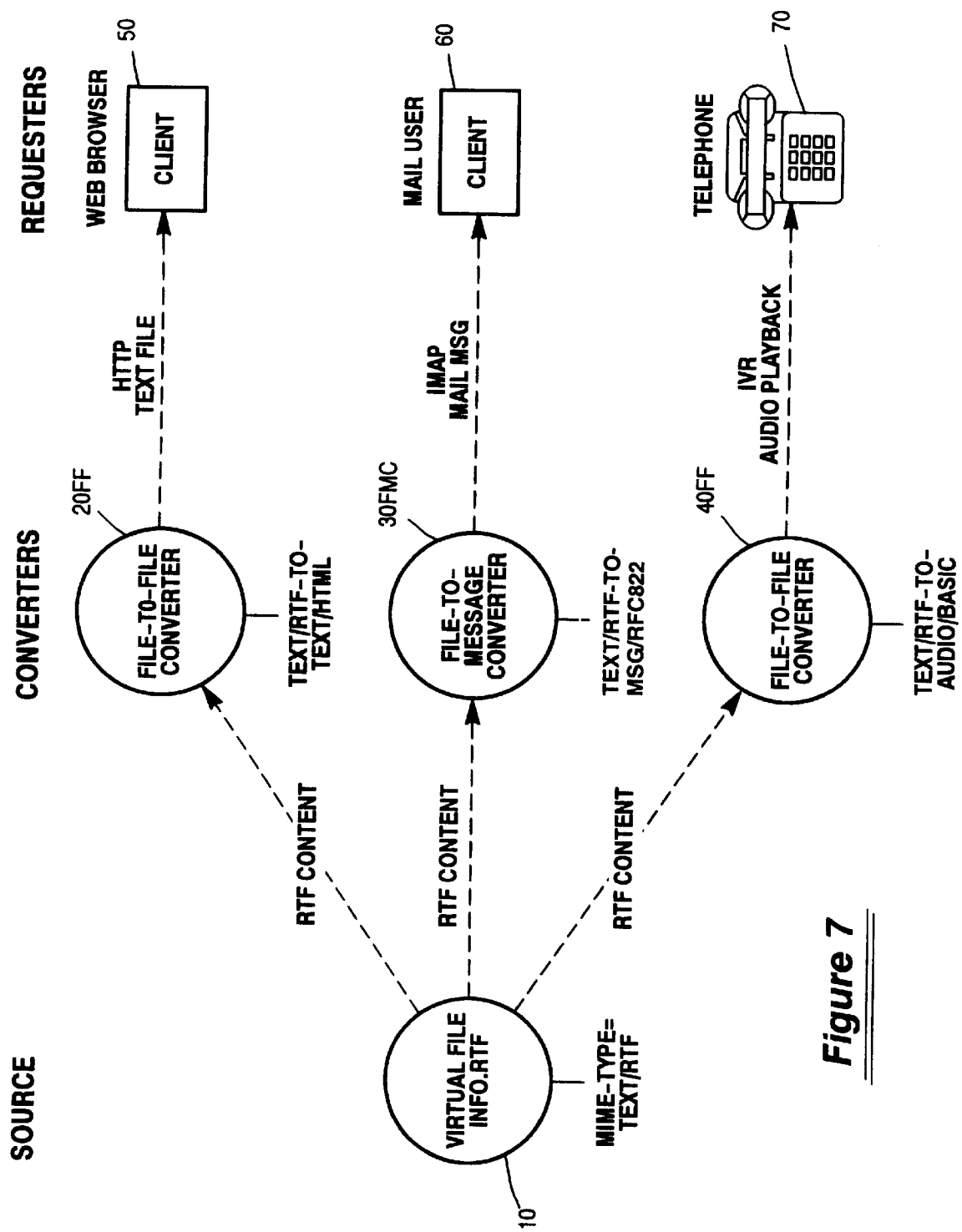
FIG. 7 illustrates the same document, a file, being dynamically converted to accommodate different format and protocol requirements.

Another dynamic conversion example is depicted in FIG. 7. In this example, three separate Clients are requesting the document 10 named "info.rtf", which is a Virtual File whose content is stored in text/rtf format. However, each Client has different requirements:

1) The Web Browser 50 is using the HTTP protocol and is requesting the document in text/html format.

2) The Mail User 60 is using the IMAP protocol and is requesting the document as a standard mail message, which corresponds to the MIME format message/rfc822.

3) The Telephone User 70 is using an IVR application and is requesting an audio rendition of the document, which can be satisfied by sending the document's content in an audio format such as audio/basic.

To satisfy each Client's requirements, three separate Converter objects have been located. The File-to-File Converter 20FF reads the file's content and performs only a MIME type conversion (text/rtf to text/html). The File-to-Message Converter 30FMC is converting the file format into a message format, and it is also converting the RTF format into a proper e-mail message (RFC822) format. The File-to-File Converter 40FF is converting the text/rtf content into an audio/basic format, which is sent via the IVR application as an audio playback to the requester's telephone. The output of each Converter object's transform function is routed back to the appropriate user.

By pre-populating the Converter hierarchy with various objects that satisfy a wide range of conversion needs, a Server can automatically and dynamically convert a document into a large number of possible formats to satisfy a broad set of clients. Furthermore, since the Server Process searches for an appropriate Converter object each time a document conversion is required, a new Converter object can be added to the database and will be immediately available for both new and existing documents.

Note that if a Server Process 52 cannot find a Converter object which will directly handle a desired conversion, it can use a feature known as "converter chaining". For example, if the Server Process 52 wishes to convert a JPEG file into a TIFF file (e.g., for faxing purposes), it may not be able to find an appropriate JPEG-to-TIFF converter. However, it may be able to find a Converter object which will convert the JPEG image into a temporary intermediate file such as a GIF file such that a second converter object can convert the GIF file into the desired TIFF file format. This technique of "converter chaining" can be extended to an arbitrary degree so that a much larger number of conversions can be performed than the number of conversions possible without chaining.

Described herein has been a multi-user network where multiple client modules operating with different protocols may receive an original source document in the properly compatible format for that receiving client module. Further, a User has the capability of authoring a single Source document and publishing it to multiple receiver appliances, each of which will receive it with the appropriate format and carried with the appropriate protocol.

While other embodiments of the described concept may be implemented for similar purposes, the present network and methodology is encompassed by the following claims.

What is claimed is:

1. In a computer network having multiple sending-receiving appliances and supporting multiple User-clients who can function as a User-author or User-requester, where each User-client utilizes a computer terminal serviced by a server module with an object database, a method for enabling a client User of any one of said appliances to communicate with any other client User of said appliances, comprising the steps of:

(a) creating a source document in a first format as an object in said database, said document constituting a file or a message as an object in said database;

(b) establishing a plurality of database objects, said objects including a hierarchy of resource objects which include (i) a virtual file object utilizing a MIME format which provides multiple sub-objects for text file, image file, audio file, video file, application file, message file, multi-part file and experimental file, (ii) a virtual message object providing virtual message sub-objects designated mail message, news message, chat message, miscellaneous message, and, (iii) a message board object providing sub-objects designated mail folder, news group, chat channel, message reflector, file reflector, and miscellaneous message board, and additionally, a class of converter objects which (iv) provide a file converter object, a message converter object, and a message board converter object, each of which provides sub-objects which provide transformation between the file converters, message converters and board converters;

(c) enabling any User-client to install a source document in said object database and to transmit the content of said source document to each one of the client Users and appliances connected to the network, in a format and transport protocol compatible with each of the receiving clients, or appliances, capabilities.

(d) utilizing a dynamic format conversion search and transformation means for locating the appropriate converter objects in said database and to utilize their format transformation functions to provide compatible formats for transmission to each one of said receiving appliances and client-Users, together with a protocol compatible to the said appliances and users.

2. In a computer network having multiple sending-receiving appliances and client-Users, each having different format requirements and operating protocols, wherein said network is supported by a server using an object database, a method for enabling any one of said appliances or client-Users to communicate with any other of said appliances or client-Users comprising the steps of:

(a) establishing, by a client-User, a source document in a first format as an object in said database;

(b) establishing an organized hierarchy of database objects which define the document content via a virtual file object, a virtual message object, or a message board object, each said virtual file object, virtual message object, and virtual message board object, including multiple sub-objects, said virtual file objects utilizing the MIME format to communicate with multiple sub-sets of file objects, said virtual message object communicating with multiple subsets of objects for mail message, news message, chat message, and said message board object, including a subset of message board objects for mail folder, newsgroup, chat channel, message reflector, file reflector and miscellaneous message boards;

(c) establishing an organized hierarchy of database objects organized in a class of converter objects which provide a file converter, a message converter, and message board converter, where each said file converter object, message converter object, and message board converter objects provide multiple subset objects which transform documents between files, messages, and message boards;

(d) receiving call requests and "get content" requests from said client users;

(e) identifying the protocol and format utilizable by each of said client Users or receiving appliances;

(f) searching said database and identifying the appropriate converter for transforming the format of said source document, said search involving the utilization of a converter object hierarchy which involves a file converter object, a message converter object, and a message board converter object, each of which has subset objects which relate files to message boards;

(g) transmitting said source document in a format and protocol compatible to a client user connected to the network.

3. In a network having digital appliances and User clients with computer terminals connected via a switching network to a content server, a method for enabling a source document created in said content server to be transmitted to any of said digital appliances or said client-Users:

(a) creating a source document as a resource object in an object database which has a plurality of resource objects working through a MIME file object including file-oriented objects and message-oriented objects, and including a plurality of specialized converter objects;

(b) enabling a client User-requester to request said source document;

(c) searching said object database to select a converter object which can dynamically convert said source document from a first format into a second format compatible to said client User-requester's requirement or said digital appliance's requirement;

(d) utilizing a selected converter object in said object database to convert the content of a requested document to a format compatible with a user-reauester's format and protocol, said converter object utilizing a hierarchical converter object and subset objects which include a file converter object, a message converter object and a message board converter object, whereupon each of said file converter object, message converter object and message board object have subset objects which can inter-relate and transform files to messages to message boards or vice-versa;

(e) enveloping said second document content format with a protocol transmittable to said client User-requester or digital appliance.

4. The method of claim 3 wherein utilizing said selected converter object of step (d) includes the steps of:

(i) converting a resource object having a message orientation to a resource object having a file-orientation;

(ii) converting a resource object having a file-orientation to a resource object having a message orientation.

5. The method of claim 3 wherein step (e) includes the step of:

(e1) utilizing a resource object having a specialized converter object to initiate a protocol envelope to deliver document content from a file protocol orientation to a message protocol orientation.

6. The method of claim 3 wherein step (e) includes the step of:

(e2) utilizing a resource object having a specialized converter object to initiate a protocol envelope to deliver document content from a message protocol orientation to a file protocol orientation.

7. In a network wherein digital appliances and multiple User clients each having a computer terminal are connected via a switching network to a content server, a system for enabling the creation of a source document in an object database and for enabling transmission of said source document to a client-User requester or a digital appliance comprising:

(a) means to originate and store a source document as an object in an object database, said object being designated as a resource object;

(b) said object database for holding objects designated as resource objects which include Virtual File objects based on a MIME file object, Virtual Message objects and Message Board objects, including a class of objects designated as Converter objects;

(c) means for requesting said source document by a User-requester from said object database;

(d) means to search and find the required source document as an object in said object database;

(e) means for selecting a converter object to modify the characteristics of said source document to render said source document in a format compatible to said user-requester, said converter object organized on a hierarchical basis wherein said converter object is selected to operate through a file converter object based on a MIME file object, a message converter object, or a message board converter object, whereupon each of said file converter, message converter and message board converter objects are connected to subset objects which correlate transformation of files to messages, messages to files, files to message boards and vice-versa, messages to message boards and vice-versa;

(f) means to package said reformatted source document into the appropriate protocol envelope for delivery to said User-requester.

8. In a data processing network including at least one content server, a plurality of digital appliances and client-Users, which may include a User-author and User-requester, for generating an operation call, each operation call specifying an operation to be performed between each User-client and said server, a system for dynamically reformatting the content of a source document and utilizing the appropriate protocol for delivery of said content to a client User-requester or a digital appliance, comprising:

(a) a content server connected to said digital appliances and said client-Users via a switching network, including:

(a1) an object database for holding Resource objects, said Resource objects including Virtual File objects based on a MIME file object, Virtual Message objects, and Message Board objects and including a class of objects designated as Converter objects, each of said Converter objects including:

(a1a) means to transform the source document's format into a resultant format usable by said client User-requester;

(a2) a database manager means for connecting a server processes module means to said object database and including:

(a2a) means for passing said operating call request and a "get content" request from said client User-requester to said object database;

(a3) said service processes module means having a specific port connecting each of said client Users, said port operating on a protocol utilizable by said client-User and including:

(a3a) dynamic search means to select a Converter object in said database necessary to transform the format content of said source document into the format required by said client-User-requester, said converter object providing a hierarchical organization of objects where a file converter object uses the MIME format, and said hierarchy further includes a message converter object and a message board converter object, wherein each said file converter, message converter and message board converter objects are connected to subsets of objects which inter-relate transformation between files, messages and message boards:

(a3b) means to envelop the content of said reformatted source document in the protocol utilizable by said client User-requester;

(a3c) means to transmit said reformatted document content via the protocol appropriate for transmission to said client User-Requester.

* * * * *